C. W. GERDES.
RIDING ATTACHMENT FOR CULTIVATORS.
APPLICATION FILED MAY 22, 1911.
1,017,209.
Patented Feb. 13, 1912.
2 SHEETS—SHEET 2.
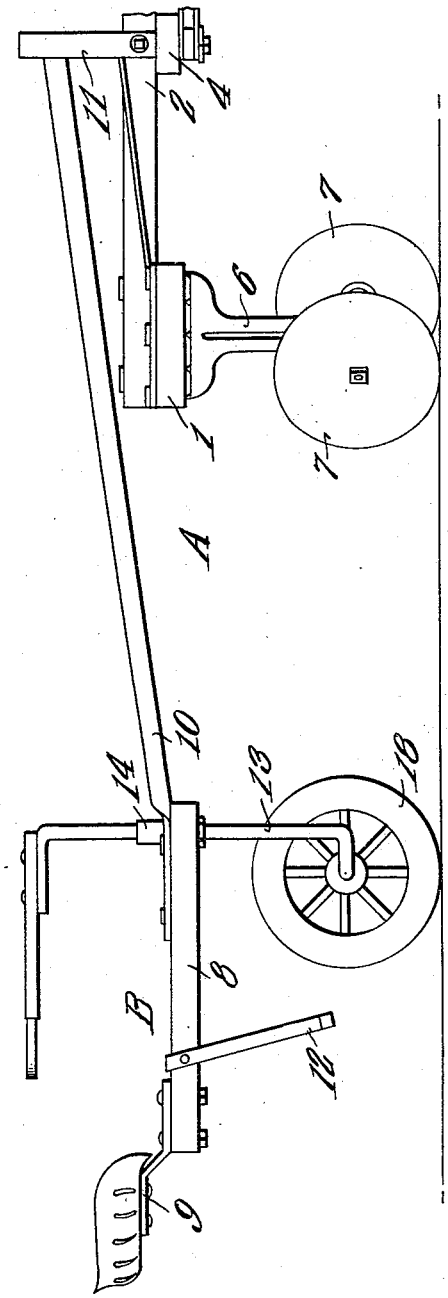
Fig. 4.
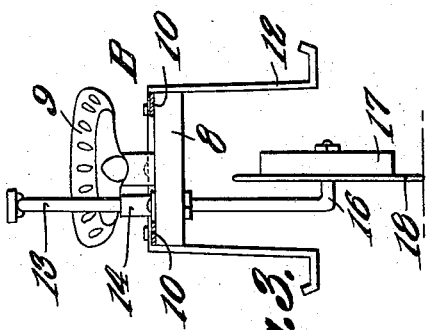
Fig. 3.
Fig. 2.
Charles W. Gerdes,
Inventor
by C. A. Snow & Co.
Attorneys
Witnesses

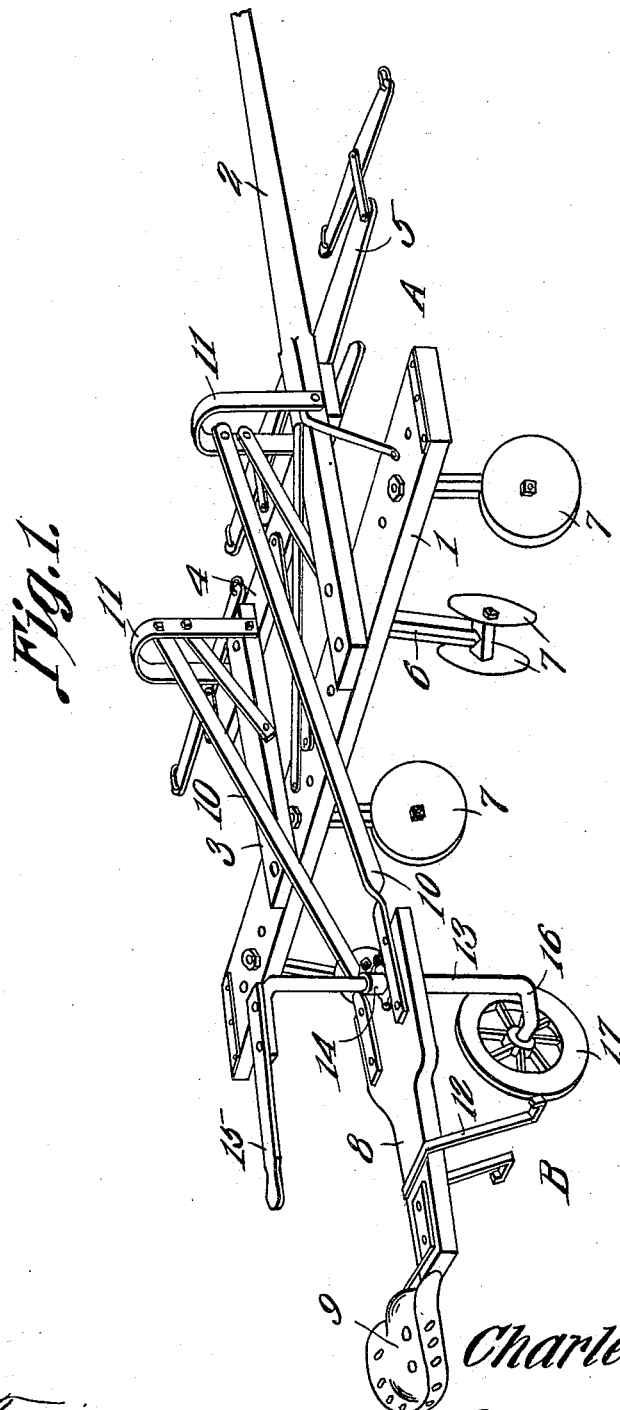

UNITED STATES PATENT OFFICE.

CHARLES W. GERDES, OF MOUND VALLEY, KANSAS.

RIDING ATTACHMENT FOR CULTIVATORS.

1,017,209. Specification of Letters Patent. Patented Feb. 13, 1912.

Application filed May 22, 1911. Serial No. 628,678.

*To all whom it may concern:*

Be it known that I, CHARLES W. GERDES, a citizen of the United States, residing at Mound Valley, in the county of Labette and State of Kansas, have invented a new and useful Riding Attachment for Cultivators, of which the following is a specification.

This invention relates to riding attachments for disk cultivators and the like and is more particularly an improvement upon the structure shown by me in Patent No. 982,051, of January 17, 1911.

One of the objects of the invention is to provide a riding attachment having novel means for connecting it to the cultivator, the seat on the attachment being so positioned relative to the supporting wheels that the weight of the driver serves to exert a lifting action upon the draft tongue of the cultivator, thus relieving the necks of the draft animals of undesirable weight which would otherwise be imposed thereon.

A further object is to provide a riding attachment which is mounted to swing freely relative to the cultivator about an axis extending transversely of the path of the cultivator, the said attachment thus riding into and out of depressions without necessitating corresponding movement of the cultivator.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a perspective view of the riding attachment connected to a disk cultivator. Fig. 2 is a side elevation of the attachment and a portion of the cultivator. Fig. 3 is a front elevation of the attachment, the coupling bars being shown in section. Fig. 4 is a plan view of the boxing of the steering shaft.

Referring to the figures by characters of reference A designates a cultivator preferably of that type disclosed in my patent hereinbefore referred to, the same including a plank 1 from which project a forwardly extending tongue 2 and a forwardly extending bracket 3, the tongue and bracket being connected by a cross bar 4 and there being suitable braces for the purpose of reinforcing the structure. Trees 5 are connected to the cross bar. Standards 6 extend downwardly from the plank 1 and cultivating disks 7 are located at the lower ends of the standards.

Arranged back of the cultivator is a riding attachment B consisting of a board 8 carrying, at its rear end, a seat 9. Obliquely disposed forwardly extending divergent side bars 10 are secured upon the board 8 and the forward ends thereof are hingedly connected with yokes 11 secured upon and extending upwardly from the tongue 2 and the bracket 3 respectively.

A foot rest 12 is arranged in front of the seat. In front of this foot rest is a steering shaft 13 mounted for rotation within a boxing 14 secured upon the board 8 and provided at its upper end, with an operating arm or lever 15 while its lower end has a rearwardly extending arm 16 carrying a caster wheel 17 designed to trail in rear of the cultivator disks 7. This wheel also constitutes means for guiding the machine, the said wheel being provided with an earth engaging flange 18 for the purpose of preventing side motion.

From the foregoing it will be seen that the weight of the operator is supported by the riding attachment some distance in rear of the wheel 17 and the forwardly extending arms 10, which are hingedly connected with the yokes 11, will thus exert an upward lifting action upon the tongue 2, thereby relieving the necks of the draft animals from the weight which would otherwise be imposed thereupon and, therefore facilitating the operation of the device.

While the attachment has been shown in connection with a disk cultivator, it is to be understood that it may be employed with other forms of agricultural machines if deemed desirable.

It will be apparent that the weight of the operator imposed on the seat 9 will practically double the weight to which the guide wheel is subjected, thus giving said wheel a better purchase on the ground and enabling